(12) United States Patent
Nagaoka et al.

(10) Patent No.: US 7,221,777 B2
(45) Date of Patent: May 22, 2007

(54) IMAGE ANALYSIS DEVICE (75) Inventors: Nobuharu Nagaoka, Nasu-gun (JP);
Masahito Watanabe, Utsunomiya (JP);
Takayui Tsuji, Utsunomiya (JP);
Hiroshi Hattori, Utsunomiya (JP);
Izumi Takatsudo, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 693 days.

(21) Appl. No.: 10/607,647

(22) Filed: Jun. 27, 2003

(65) Prior Publication Data
US 2004/0032971 A1  Feb. 19, 2004

(30) Foreign Application Priority Data
Jul. 2, 2002  (JP)  ............................. 2002-193577

(51) Int. Cl.
*G06K 9/00* (2006.01)
(52) U.S. Cl. ..................... 382/104; 382/106; 382/154
(58) Field of Classification Search ................. 382/103
See application file for complete search history.

(56) References Cited

U.S. PATENT DOCUMENTS 5,381,173 A * 1/1995 Asayama .................... 348/170
5,422,828 A * 6/1995 Choate et al. .............. 342/458
5,557,323 A * 9/1996 Kajiwara .................... 348/140
6,021,209 A * 2/2000 Hirabayashi et al. ....... 382/103
6,327,536 B1  12/2001 Tsuji et al.
6,531,959 B1  3/2003 Nagaoka et al.
6,775,395 B2 * 8/2004 Nishigaki et al. ........... 382/104
6,909,802 B2 * 6/2005 Nakamura .................. 382/154
2005/0232463 A1 * 10/2005 Hirvonen et al. ........... 382/103

FOREIGN PATENT DOCUMENTS

JP  05-303643  11/1993
JP  2001-006096  1/2001

* cited by examiner

*Primary Examiner*—Jingge Wu
*Assistant Examiner*—Hadi Akhavannik
(74) *Attorney, Agent, or Firm*—Carrier, Blackman & Associates, P.C.; Joseph P. Carrier; William D. Blackman (57) ABSTRACT

An image analysis device installed on a vehicle for detecting objects that are likely to affect the vehicle. An image processing unit included in the image analysis device sets a seeking area in a left-hand image of the field, and calculates a moving increment for seeking "Step" using a variable "n". A correlation calculation process is sequentially executed in the seeking area set in the left-hand image of the field while moving a reference image stepwise at the moving increment "Step" so as to obtain a correlation area that gives the highest degree of correlation, and then a new seeking area is set, which consists of the correlation area and horizontally arranged two areas that sandwich the correlation area, and the moving increment "Step" is decreased in order to reduce the amount of calculation.

9 Claims, 8 Drawing Sheets

TARGETS RESPECTIVELY SURROUNDED
BY FRAMES P1 TO P4 ARE OBJECTS

IMAGE ANALYSIS DEVICE

BACKGROUND OF THE INVENTION

1. Field of the Invention

The present invention relates to an image analysis device which is to be installed on a vehicle, and which detects objects that are likely to influence travel of the vehicle from an image of a field taken by an image-taking section.

2. Description of the Related Art

An example of such a device installed on a vehicle, which detects objects, such as pedestrians that may collide with the vehicle, from images of the surrounding environment taken by an image-taking section consisting of, for example, infrared cameras, and which provides such information to the driver of the vehicle, is disclosed, for example, in Japanese Unexamined Patent Application, First Publication No. 2001-6096.

In this device, the images of the surrounding environment are taken by a pair of stereo-infrared cameras that are disposed laterally, and a right-hand of the field taken by one of the infrared cameras disposed in the right undergoes a segmentation process in order to extract a first image of an object. Next, a seeking area, in which seeking of an image corresponding to the first image of the object is executed, is set in a gray scale image of a left-hand image of the field taken by the other of the infrared cameras disposed in the left, and correlation calculation processes are sequentially applied to the first image of the object and images of objects in the seeking area in order to extract another image of the object, i.e., a second image of the object, corresponding to the first image of the object. Moreover, a parallax Δd (the number of pixels) is calculated based on the positional difference between the geometric center of the first image of the object in the right-hand image of the field and the geometric center of the second image of the object in the left-hand image of the field, and then the distance "z" between the vehicle and the object is calculated.

Next, the correlation calculation process will be more specifically explained. The distance "z" to the object is calculated using the following equation (1) based on an object parallax Δd obtained by the pair of cameras:

$$z = f \times D / (\Delta d \times p) \qquad (1)$$

where "f" is a focal length of the camera, D is the distance between the pair of stereo cameras (the length of a baseline), and "p" is the pitch between the pixels.

Figure 10:
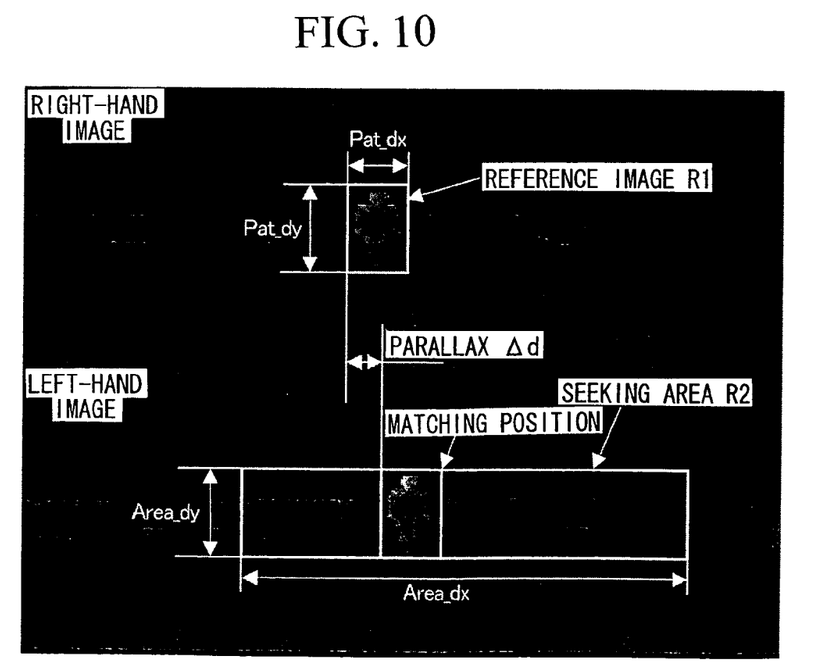
FIG. 10 is a diagram showing a step in a correlation calculation process, which is applied to a seeking area, in a conventional image analysis device.

As shown in FIG. 10, the object parallax Δd is determined in such a manner that a reference pattern "Pat" ("Pat" is defined by Pat_dx×Pat_dy) of the right-hand image of the field is shifted one pixel by one pixel in the seeking area "Area" ("Area" is defined by Area_dx×Area_dy) of the left-hand image of the field so as to find a position of the reference pattern "Pat" which gives the highest degree of correlation.

In this process, a "SAD (Sum of Absolute Difference)" process is used to find a position cx of the reference pattern "Pat" where a correlation error "Error", which is defined by the following equation (2), is minimized, as the position which gives the highest degree of correlation:

$$\text{Error}(cx) = \Sigma_i \Sigma_j |\text{Pat}(i)(j) - \text{Area}(i+cx)(j)| \qquad (2),$$

where $0 \leq cx < (\text{Area\_dx} - \text{Pat\_dx} + 1)$, $0 \leq i < \text{Pat\_dx}$, and $0 \leq j < \text{Pat\_dy}$.

Accordingly, assuming that a set of calculations is required when the difference between "Pat" and "Area" corresponds to one pixel, the number of sets of calculations in the equation (2) is expressed by the following equation (3):

$$\text{Calc}\_N = (\text{Pat\_dx} \times \text{Pat\_dy}) \times (\text{Area\_dx} - \text{Pat\_dx} + 1) \qquad (3).$$

When a device, in which the correlation calculation process according to the above algorithm is executed, is used, a portion of the second image of the object, which gives the highest degree of correlation with the first image of the object that is extracted from the right-hand image of the field, can be accurately extracted from the seeking area in the second image of the object; however, the calculation time is substantially determined by the processing capacity of the associated hardware.

More specifically, when a detection, in which objects that are likely to influence travel of the vehicle are sought in the images taken by the image-taking section, is performed, because the objects whose images are being taken by the image-taking section move continuously as the vehicle runs, a computer having an extremely high-speed processing capacity is required in order to complete the correlation calculation processes between the first image of the object extracted from the right-hand image of the field and the seeking area set in the gray scale image of the left-hand image of the field within a period during which the objects are being taken by the image-taking section; however, such a high performance computer is quite expensive, consumes a considerable amount of electrical power, and is difficult to be installed on a vehicle in terms of space for installation.

SUMMARY OF THE INVENTION

In consideration of the above circumstances, two objects of the present invention are to provide an image analysis device which is capable of detecting an object from a seeking area through as simple a calculation process as possible, and which is capable of making the driver recognize objects that are likely to influence travel of the vehicle.

In order to solve the above problems and to achieve the above objects, the present invention provides an imaging perception device including first and second cameras which together constitute a set of stereo cameras, and a distance calculation section which is adapted to calculate distance to an object in such a manner that a first image of the object is extracted from an image of a field taken by the first camera while a second image of the object corresponding to the first image of the object is extracted from a seeking area being set, in another image of the field taken by the second camera, depending on the extracted first image using a correlation calculation process, and then a parallax between the first and second images is calculated, wherein the distance calculation section is further adapted to set a moving increment based on the width of an object frame that is determined depending on the first image of the object, and to execute the correlation calculation process while moving the first image of the object stepwise at the moving increment in the seeking area so as to extract a new seeking area which consists of a correlation area that exhibits a high degree of correlation with the first image of the object and two areas that sandwich the correlation area.

According to the image analysis device configured as described above, when the distance calculation section applies the correlation calculation process between the first image of the object and the seeking area set in the image of the field taken by the second camera, the correlation calculation process is applied so as to roughly seek in the seeking area while moving the first image of the object stepwise at a moving increment which is determined based on the object frame that is set for the first image of the object. As a result, a smaller seeking area, as a new seeking area, can be extracted, which has a high degree of correlation with the first image of the object, and in which the second image of the object is likely to exist, through an accurate and small quantity of calculations.

In the above image analysis device, the moving increment may be set to be equal to the width of the object frame.

According to the image analysis device configured as described above, because the moving increment, at which the first image of the object is moved stepwise in the seeking area, is set to be equal to the width of the object frame that is set to the first image of the object, the correlation calculation process will not be duplicated when the first image of the object is moved in the seeking area, and thus the correlation calculation process can be effectively executed over the entire seeking area. In addition, because the image of the object that corresponds to the first image of the object is detected just once in the seeking area, the object can be easily differentiated from other things.

In the above image analysis device, the distance calculation section may be further adapted to reset the moving increment to a smaller moving increment based on the width of the object frame every time the new seeking area is extracted, and to execute the correlation calculation process in the new seeking area while moving the first image of the object stepwise at the smaller moving increment.

According to the image analysis device configured as described above, the distance calculation section sets a smaller seeking area extracted through the correlation calculation process as a new seeking area, and resets the moving increment, at which the first image of the object is moved during the correlation calculation process, to a smaller moving increment with reference to the width of the object frame as the seeking area becomes smaller, and then a further correlation calculation process is executed in the new seeking area while moving the first image of the object at the smaller moving increment. As a result, precise seeking can be executed in the seeking area while moving the first image of the object at the smaller moving increment as the seeking area becomes smaller and areas having a high degree of correlation are narrowed down, and thus an accurate correlation calculation process can be effectively executed with minimum quantity of calculations.

DESCRIPTION OF THE PREFERRED EMBODIMENTS

An embodiment of the present invention will be explained below with reference to the appended drawings.

Figure 1:
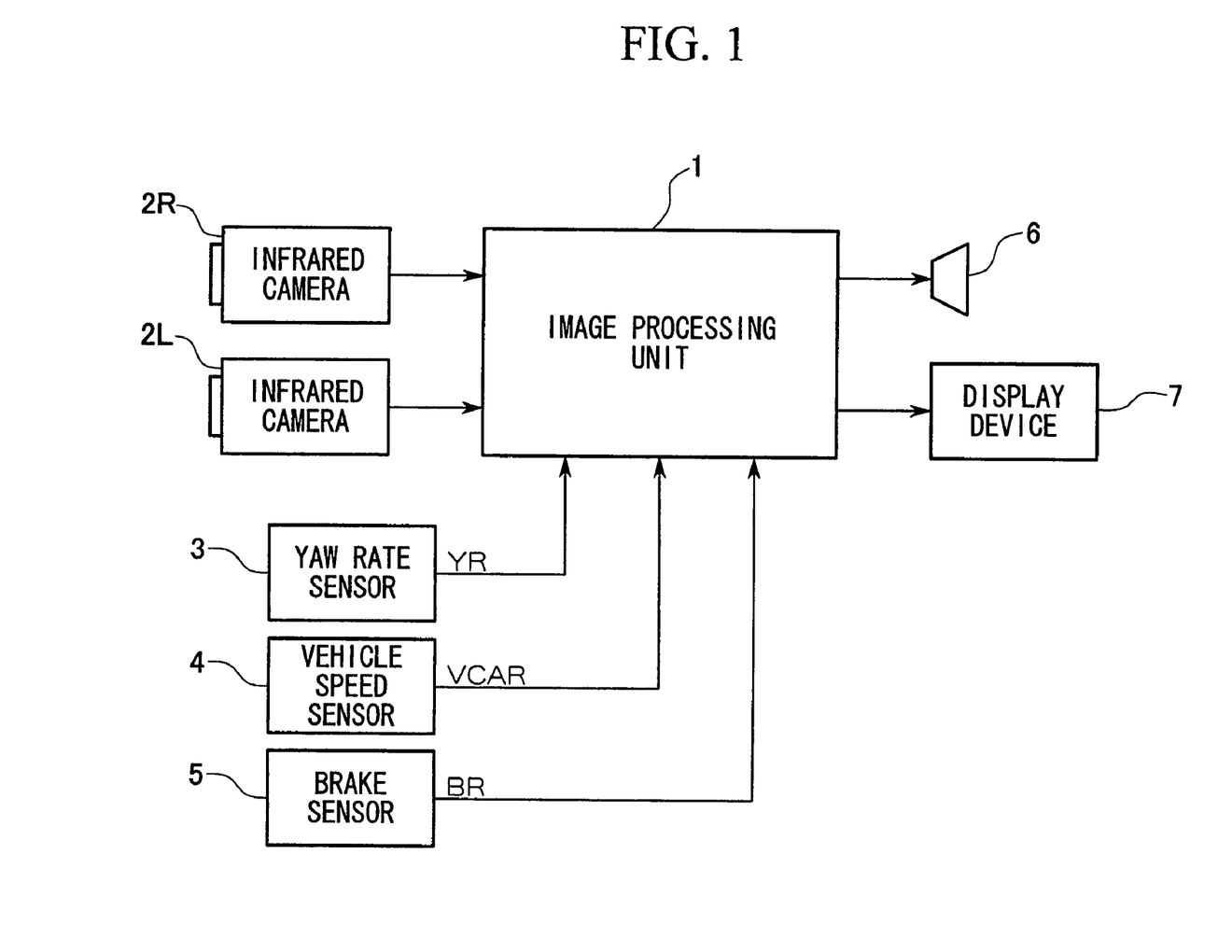
FIG. 1 is a block diagram showing a general structure of an embodiment of an image analysis device according to the present invention.

FIG. 1 is a block diagram showing a general structure of an embodiment of an image analysis device according to the present invention.

In FIG. 1, reference symbol 1 indicates an image processing unit including a CPU (Central Processing Unit) which controls the image analysis device according to the present embodiment. To the image processing unit 1, two infrared cameras 2R and 2L that are capable of sensing far-infrared, a yaw rate sensor 3 for measuring yaw rate of the vehicle, a vehicle speed sensor 4 for measuring running speed of the vehicle, and a brake sensor 5 for detecting an operation of a brake are connected. Having such a structure, the image processing unit 1 detects moving objects in front of the vehicle, such as pedestrians, animals, etc., based on the infrared images of the surroundings and signals indicating the running state of the vehicle, and the image processing unit 1 gives a warning when it determines that there is high probability of collision.

Moreover, a speaker 6 for giving a spoken warning, and an image display device 7 are connected to the image processing unit 1. The display device 7 is provided for making the driver of the vehicle recognize an object that has high probability of collision by displaying the image of the object in an accentuated manner along with the images of the field taken by the infrared cameras 2R and 2L only when it is determined that the object has high probability of collision. The display device 7 may include, for example, a meter-integrated display having an integrated meter for digitally indicating the running state of the vehicle, a navigation display installed in the console of the vehicle, a HUD 7a (Head Up Display) for displaying information in the window shield where driver's forward view is not blocked, etc.

The image processing unit 1 further includes an A/D converter for converting input analog signals into digital signals, an image memory for storing digitalized image signals, a CPU (Central Processing Unit) for executing Various calculations, a RAM (Random Access Memory) for storing data produced during calculations by the CPU, a ROM (Read Only Memory) for storing programs that are executed by the CPU, tables, and maps, an output circuit for outputting drive signals for the speaker 6, display signals for the image display device 7, etc., and thus the output signals from the infrared cameras 2R and 2L, yaw rate sensor 3, vehicle speed sensor 4, and brake sensor 5 are converted into digital signals, and then the digital signals are input into the CPU.

Figure 2:
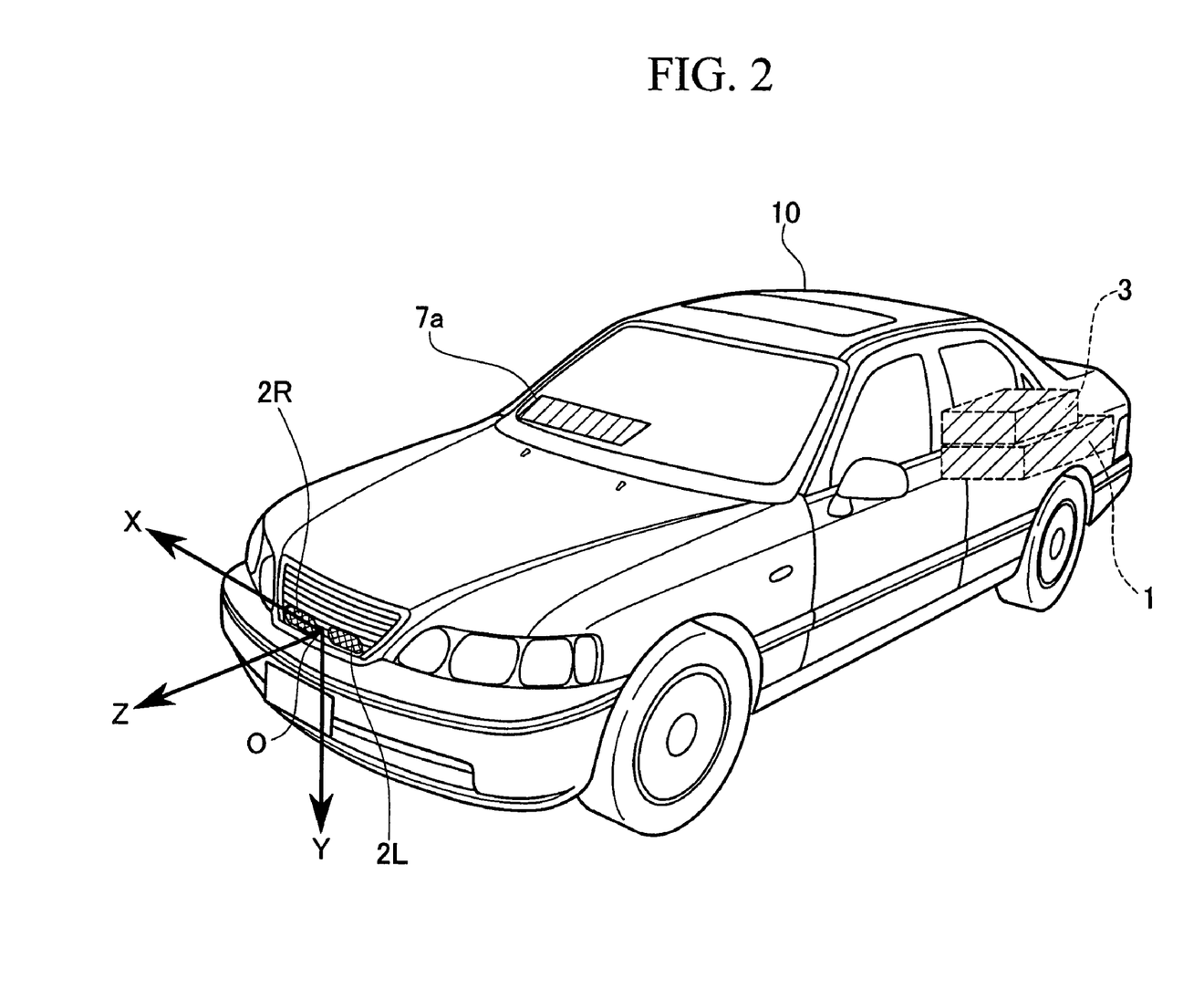
FIG. 2 is a diagram showing mounting positions of infrared cameras, sensors, a display, etc. in a vehicle.

As shown in FIG. 2, the infrared cameras 2R and 2L are mounted on the vehicle 10 in such a manner that the infrared cameras 2R and 2L are disposed symmetrically with respect to the center of the width of the vehicle, the optical axes of the infrared cameras 2R and 2L are arranged to be parallel to each other, and the infrared cameras 2R and 2L are positioned at the same level. The infrared cameras 2R and 2L output greater output signals (exhibit greater brightness) as the temperature of an object is higher.

The position of the HUD 7a is determined so that the image displayed in the window shield of the vehicle 10 will not block the driver's forward view.

Next, the operation in the present embodiment will be explained with reference to the appended drawings.

Figure 3:
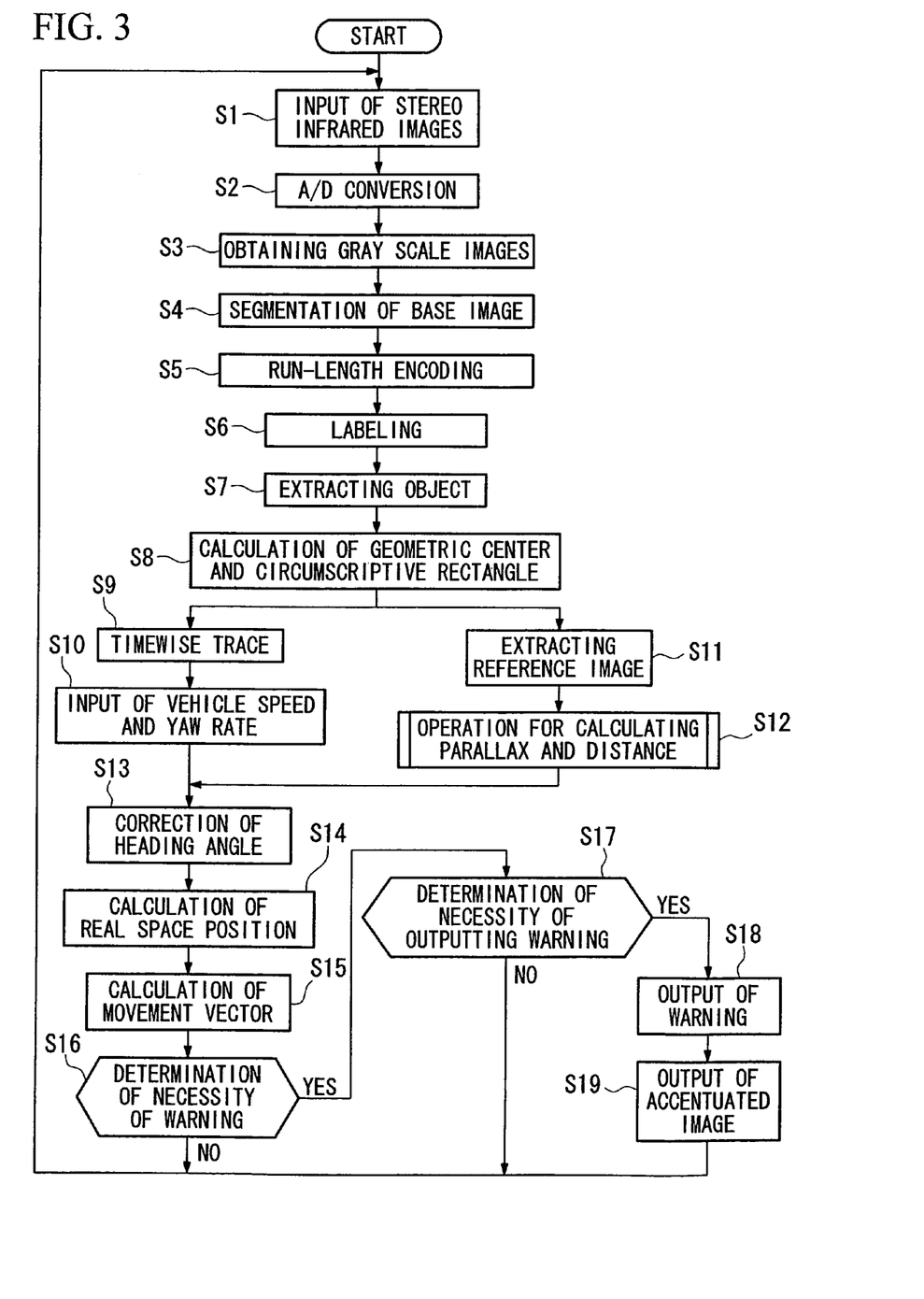
FIG. 3 is a flowchart showing the operations for detecting objects and for giving a warning executed in the image analysis device of the above embodiment.

FIG. 3 is a flowchart showing the operations for detecting objects, such as pedestrians, etc., and for giving warnings which are executed in the image processing unit 1 of the image analysis device according to the above embodiment.

The image processing unit 1 obtains infrared images, which are signals output from the infrared cameras 2R and 2L (step S1), executes an analog-to-digital conversion (step S2), and inputs gray scale images into the image memory (step S3). Note that a right-hand image of the field is obtained by the infrared camera 2R, and a left-hand image of the field is obtained by the infrared camera 2L. Because the position of an object in the right-hand image of the field in terms of the horizontal direction differs from that in the left-hand image of the field, the distance to the object can be calculated using the amount of difference (i.e., a parallax).

After obtaining the gray scale images in step S3, the right-hand image obtained by the infrared camera 2R is set as a base image, and a segmentation process is applied to the base image (step S4) in which segments having greater brightness than a brightness threshold ITH are deemed to be "1" (white), and segments having less brightness than the brightness threshold ITH are deemed to be "0" (black).

Figure 4A:
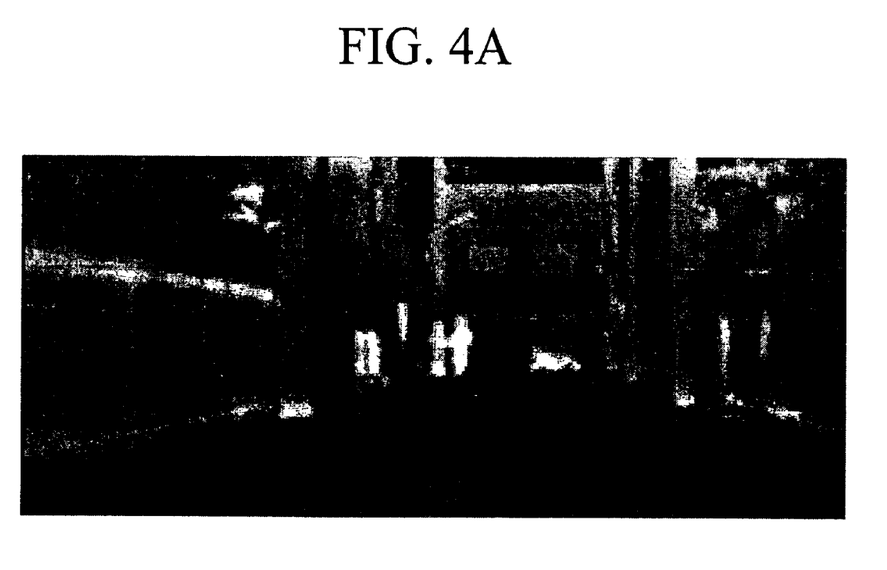
FIG. 4A is a diagram showing a gray scale image obtained by the infrared camera.
Figure 4B:
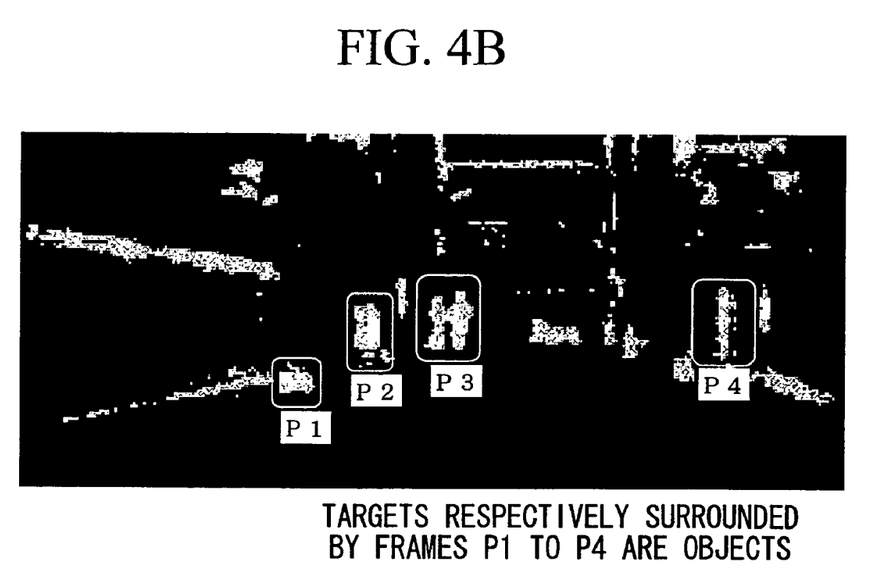
FIG. 4B is a diagram showing a segmented image of the gray scale image shown in FIG. 4A.

FIG. 4A is a diagram showing the gray scale image obtained by the infrared camera 2R, and the image shown in FIG. 4B is obtained by applying a segmentation process to the gray scale image. In FIG. 4B, portions indicated by frames P1 to P4 correspond to objects that are shown in white (hereinafter referred to as "bright segments") in the display image.

After obtaining segmented image data from the infrared images, a process for converting the segmented image data into run-length data, i.e., a run-length encoding process, is applied (step S5). Based on the run-length data, strips are drawn each of which consists of the pixels of the segments that are deemed to be white after the segmentation process. The width of each of the strips in the y direction corresponds to one pixel, and the length of each of the strips in the x direction corresponds to the number of pixels that correspond to the run-length data.

Next, a labeling process is applied to the run-length encoded image data (step S6) so as to extract the objects (step S7). More specifically, among the strips of the run-length encoded data, the strips, which include portions that overlap each other in the y direction, are deemed to originate from one object, and thus, for example, the bright segments P1 to P4 shown in FIG. 4B are deemed to be the object (i.e., segmented objects).

After extracting the objects, with regard to each of the objects, the geometric center G, the area S, and the aspect ratio ASPECT of the circumscriptive rectangle are calculated (step S8).

When the run-length data of the object having a label A is expressed in (x (i), y (i), run (i), A) (i=0, 1, 2, . . . , N−1), the area S is calculated by accumulating the lengths of the run-length data (run (i)−1) for the same object having "N" run-length data. The coordinates (xc, yc) of the geometric center G of the object A are calculated in such a manner that, first, the length (run (i)−1) of each of the run-length data is multiplied by the x coordinate x (i) of each of the run-length data and by the y coordinate y (i) of each of the run-length data so as to obtain a plurality of products, next, all the products are summed up for the same object, and finally, the summation is divided by the area S.

The aspect ratio ASPECT is calculated as the ratio Dy/Dx, where Dy is the height of the circumscriptive rectangle of the object, and Dx is the width of the circumscriptive rectangle of the object.

Because each of the run-length data is expressed by the number of pixels (number of coordinate) (i.e., run (i)), "1" must be subtracted (i.e., run (i)−1) to obtain an actual length. The position of the geometric center G of the circumscriptive rectangle may be used instead of the position of the geometric center G of the object.

Upon completion of calculations of the geometric center of the object, the area, and the aspect ratio of the circumscriptive rectangle, the object is followed in terms of time, i.e., the same object is recognized every time at an interval of a sampling frequency (step S9). More specifically, continuous following is executed in such a manner that, first, time "t" as an analog value is made discrete using the sampling frequency to obtain discrete times "k", and then, for example, if objects A and B are extracted at time "k", it is determined whether objects C and D extracted at time (K+1) are the same as the objects A and B. When it is determined that the objects A and B are the same as the objects C and D, respectively, the objects C and D are relabeled as objects A and B, and thus continuous following of the objects is continued.

The coordinates (of the geometric center) of each of the objects thus recognized are stored in the memory as time series data, and the time series data are used in the subsequent calculation processes.

The operations in steps S4 to S9 are applied to the segmented base image (i.e., to the right-hand image of the field in this embodiment).

Next, vehicle speed VCAR measured by the vehicle speed sensor 4, and yaw rate YR measured by the yaw rate sensor 3 are read in, and then the heading angle θr of the vehicle 10 is calculated by applying time integration to the yaw rate YR (step S10).

On the other hand, simultaneously with the operations in steps S9 and S10, operations for calculating the distance "z" between the objects and the vehicle are executed in steps S11 and S12. Because the above-mentioned calculating operations take longer time than the operations in steps S9 and S10, the calculating operations are executed in a longer period than in the cases of steps S9 and S10 (e.g., in a period approximately three times the period required for executing steps S1 to S10).

First, one of the objects that are followed using the segmented base image (the right-hand image of the field) is selected, and a reference image R1 is extracted from the right-hand image of the field (step S11). Note that the entire area that is surrounded by the circumscriptive rectangle is designated as the reference image, and the circumscriptive rectangle is designated as an object frame in this embodiment.

Next, a seeking area is set in the left-hand image of the field in order to seek an image (hereinafter referred to as a "corresponding image"), which corresponds to the reference image R1, in the left-hand image of the field, and then an operation for calculating parallax and distance is performed by executing a correlation calculation process, and thus the distance "z" between the vehicle 10 and the object (step S12) is calculated. The operation for calculating parallax and distance for determining the distance "z" between the vehicle 10 and the object in step S12 will be explained in detail separately.

Upon completion of calculation of heading angle θr in step S10 and calculation of the distance to the object in step S12, a heading angle correction operation is executed, in which the image that moves due to turning of the vehicle 10 is corrected (step S13). The heading angle correction operation is a correcting process in which the image area, which is shifted in the x direction by an amount of Δx due to turning of the vehicle 10 to the left by an angle of θr from time "k" to time (k+1), is corrected.

After completion of the heading angle correction, the coordinates (x, y) and the distance "z" are converted into real space coordinates (X, Y, Z) (step S14).

As shown in FIG. 2, the real space coordinate (X, Y, Z) system is set such that the origin thereof is positioned at the midpoint between the infrared cameras 2R and 2L, which is fixed on the vehicle 10, and the axes are set, respectively, as shown. The coordinates in the image of the field are set such that the origin is positioned at the center of the image, the horizontal direction is designated as the x axis, and the vertical direction is designated as the y axis.

In the following description, the coordinates after the heading angle correction are expressed as (X, Y, Z).

Upon completion of the heading angle correction operation with respect to the real space coordinates, an approximation line LMV that corresponds to the relative movement vector between the object and the vehicle 10 is calculated based on the "N" real space position data (e.g., N is 10 or so), i.e., time series data.

Next, the newest position coordinates P (0), where P (0)=(X (0), Y (0), Z (0)), and retro-position coordinates P (N−1) corresponding to a sample ascending by (N−1) samples (ascending by time ΔT), where P (N−1)=(X (N−1), Y (N−1), Z (N−1)), are corrected to the positions on the approximation line LMV in order to obtain positions Pv (0) and Pv (N−1), where Pv (0)=(Xv (0), Yv (0), Zv (0)) and Pv (N−1) (Xv (N−1), Yv (N−1), Zv (N−1)).

As a result, the relative movement vector is obtained as a vector directing from the position coordinates Pv (N−1) to the position coordinates Pv (0) (step S15).

Through the above process, the relative movement vector is obtained by calculating the approximation line that approximates the relative movement trace of the object with respect to the vehicle 10 using a plurality of data (N data) contained in the monitoring period ΔT, and thus it is possible to more accurately predict probability of collision to the object while reducing influence of error in position determination.

After obtaining the relative movement vector in step S15, an operation for determining necessity of warning, in which it is determined whether or not there is probability of collision of the vehicle 10 with the detected object, is executed (step S16).

When it is determined in step S16 that there is no probability of collision of the vehicle 10 with the detected object (i.e., when the result of determination in step S16 is "NO"), the operation returns to step S1 for repeating the above operations.

In contrast, when it is determined in step S16 that there is some probability of collision of the vehicle 10 with the detected object (i.e., when the result of determination in step S16 is "YES"), the operation proceeds to step S17 that is provided for determining necessity of outputting a warning.

In step S17, it is determined whether or not a warning should be output based on determination as to whether or not the driver of the vehicle 10 operates the brake of the vehicle by referring to an output signal BR from the brake sensor 5.

When it is determined that the driver of the vehicle 10 operates the brake of the vehicle, an acceleration Gs (a positive sign corresponds to deceleration) due to braking is calculated, and when the acceleration Gs is greater than a predetermined threshold GTH, it is determined that collision will be prevented by the braking operation, which means that the result of determination in step S17 is "NO", and the operation for determining necessity of outputting a warning is terminated, and then the operation returns to step S1 for repeating the above operations.

As a result, when an appropriate braking operation is executed, a warning will not be output so as not to bother the driver without necessity.

In contrast, when the acceleration Gs is equal to or less than a predetermined threshold GTH, or when it is determined that the driver of the vehicle 10 does not operate the brake of the vehicle, which means that the result of determination in step S17 is "YES", the operation immediately proceeds to step S18, in which a voice warning is output using the speaker 6 because there is high probability of collision or contact to the object, and then, in step S19, the image obtained by, for example, the infrared camera 2R is displayed on the image display device 7, and more specifically, the approaching object is displayed as an accentuated image to the driver of the vehicle 10. The predetermined threshold GTH is set as an acceleration value (deceleration, actually) with which the vehicle 10 can stop within the current distance between the object and the vehicle 10 starting from the current vehicle speed and assuming that the current acceleration Gs is maintained.

The operations for detecting objects and for outputting a warning executed in the image processing unit 1 of the image analysis device according to the present embodiment are explained above. Next, the operation for calculating parallax and distance in step S12 illustrated in the flowchart of FIG. 3 for determining the distance "z" between the vehicle 10 and the object will be further explained in detail with reference to the flowchart shown in FIG. 5.

Figure 5:
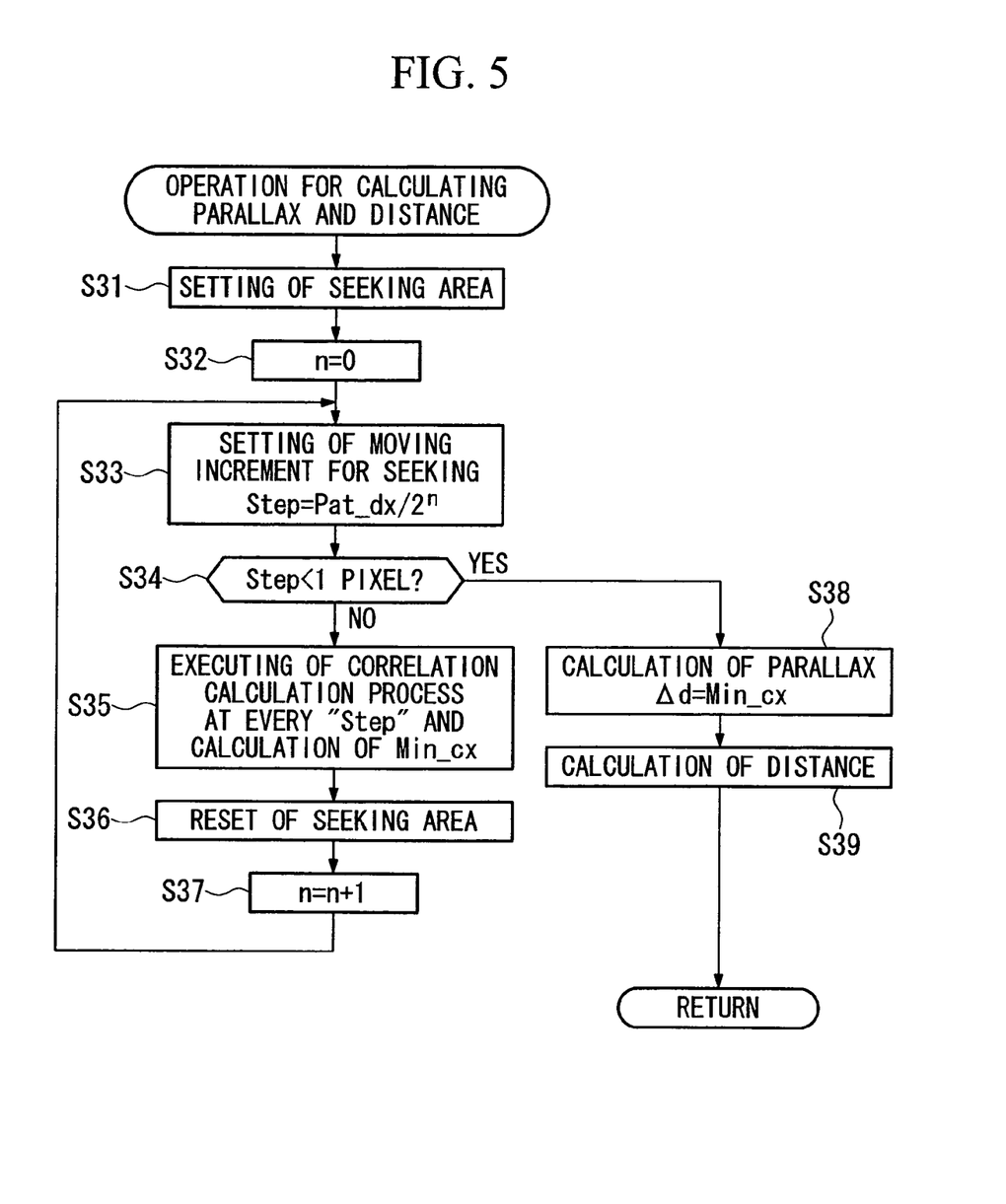
FIG. 5 is a flowchart showing the operation for calculating parallax and distance executed in the image analysis device of the above embodiment.

FIG. 5 is a flowchart showing the operation for calculating parallax and distance executed in the present embodiment.

The image processing unit 1 sets a seeking area R2 in the left-hand image of the field for seeking an image corresponding to the reference image R1 in the right-hand image of the field (step S31).

A variable "n" for determining an increment (a moving increment "Step") for seeking operation is initialized to be "0" (step S32).

The increment for seeking operation (Step) is calculated using the following equation (4) (step S33):

$$Step = Pat\_dx/2^n \quad (4).$$

After determining the increment ("Step") for seeking operation, it is determined whether "Step" is less than the width of one pixel (step S34).

When it is determined in step S34 that the calculated "Step" is equal to or greater than the width of one pixel (i.e., when the result of determination in step S34 is "NO"), the correlation calculation processes are sequentially executed in the seeking area R2 set in the left-hand image of the field while moving the reference image R1 stepwise at the increment of "Step", so that an image corresponding to the reference image R1 is extracted from the left-hand image of the field (step S35).

Figure 6:
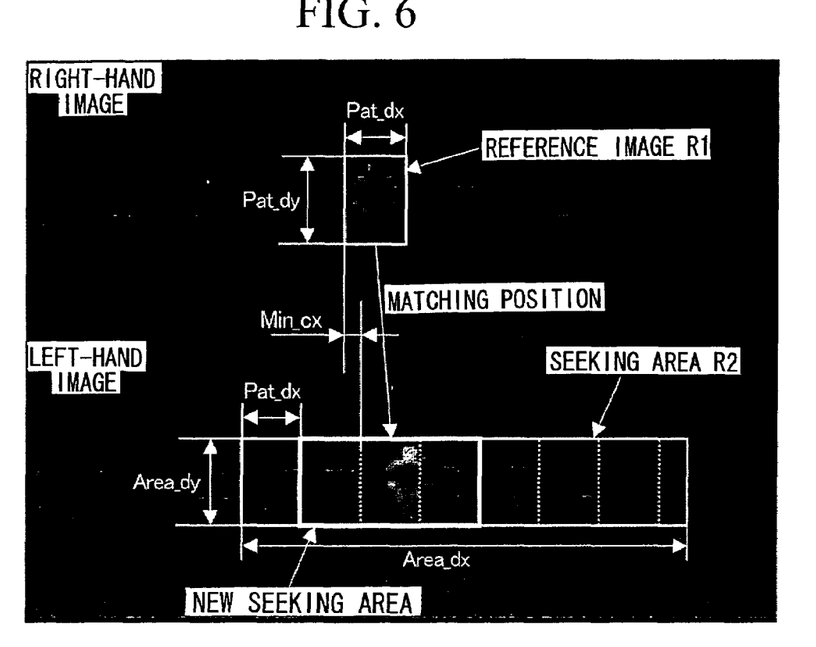
FIG. 6 is a diagram illustrating a step in a correlation calculation process, which is being applied to a seeking area, in the image analysis device of the above embodiment.

More specifically, as shown in the diagram of FIG. 6 illustrating the correlation calculation process that is applied to the seeking area, the position of the reference image R1 is sequentially moved in the seeking area R2 from the left thereof stepwise at the increment of "Step" while executing the correlation calculation process at each of the positions using a "SAD (Sum of Absolute Difference)" process therein, and the correlation error "Error" defined in the above-described equation (2) is calculated at each of the positions of the reference image R1. The position of the reference image R1 at which the correlation error "Error" is minimized is deemed as the position which gives the highest degree of correlation, and then a differential (parallax) Min_cx, which is defined by the horizontal distance between the position of the reference image R1 which gives the minimum "Error" in the left-hand image of the field and the position of the reference image R1 in the right-hand image of the field, is calculated.

When a residual, which is obtained by dividing Area_dx by Pat_dx, is greater than Pat_dx/2 (i.e., in the case in which the width of the residual area, which is smaller than the reference image R1, and which remains at the right end of the seeking area R2 after moving the reference image R1 stepwise at the increment of "Step" in the seeking area R2 from the left thereof, is greater than a half of the width of the reference image R1), the correlation calculation process with respect to the reference image R1 is also applied to the residual area.

After obtaining the differential (parallax) Min_cx between the position of the reference image R1 which gives the minimum "Error" in the left-hand image of the field and the position of the reference image R1 in the right-hand image of the field, a new seeking area R2 is set, which consists of a correlation area corresponding to the position of the reference image R1 which gives the minimum "Error" and horizontally arranged two areas that sandwich the correlation area (step S36).

The variable "n" for determining the moving increment for seeking is reset according to the equation (5) shown below (step S37):

$$n = n+1 \tag{5}$$

;and the operation returns to step S33 for repeating the above operations.

In contrast, when it is determined in step S34 that the calculated "Step" is less than the width of one pixel (i.e., when the result of determination in step S34 is "YES"), the finally calculated position of the reference image R1 which gives the minimum "Error" is deemed as the position of the image corresponding to the reference image R1, and the differential (parallax) Min_cx between this position and the position of the reference image R1 is set as the parallax Δd shown in FIG. 10 (step S38).

Next, the distance "z" to the object is calculated using the parallax Δd according to the above-described equation (1) (step S39), so that the operation for calculating parallax and distance is terminated, and then the operation returns to step S13 in the flowchart shown in FIG. 3.

The repeating operations from step S33 to step S37 in the operation for calculating parallax and distance described above will be further explained below with reference to the drawings.

Figure 7:
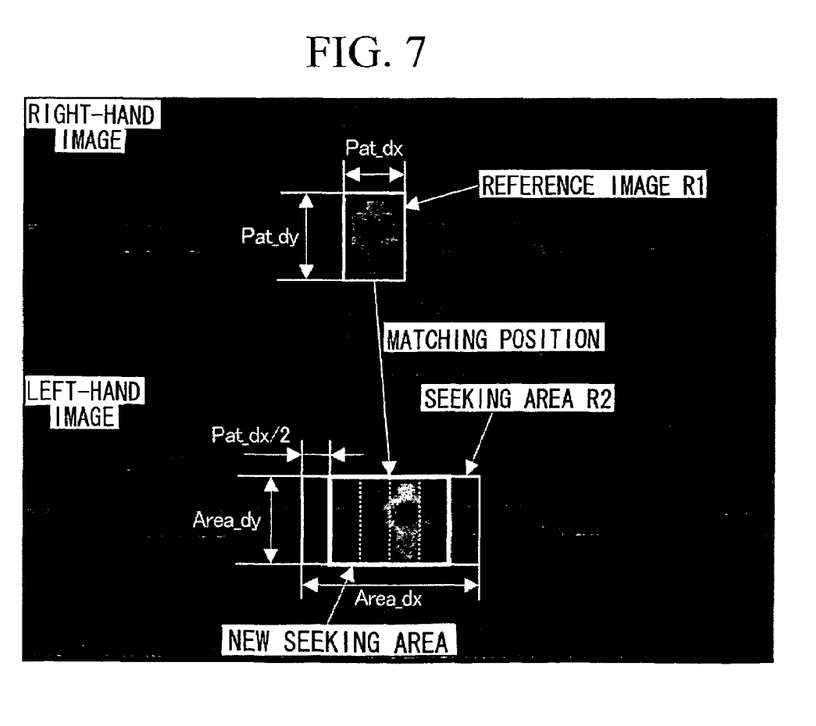
FIG. 7 is a diagram illustrating another step in the correlation calculation process, which is being applied to a new and smaller seeking area, in the image analysis device of the above embodiment.
Figure 8:
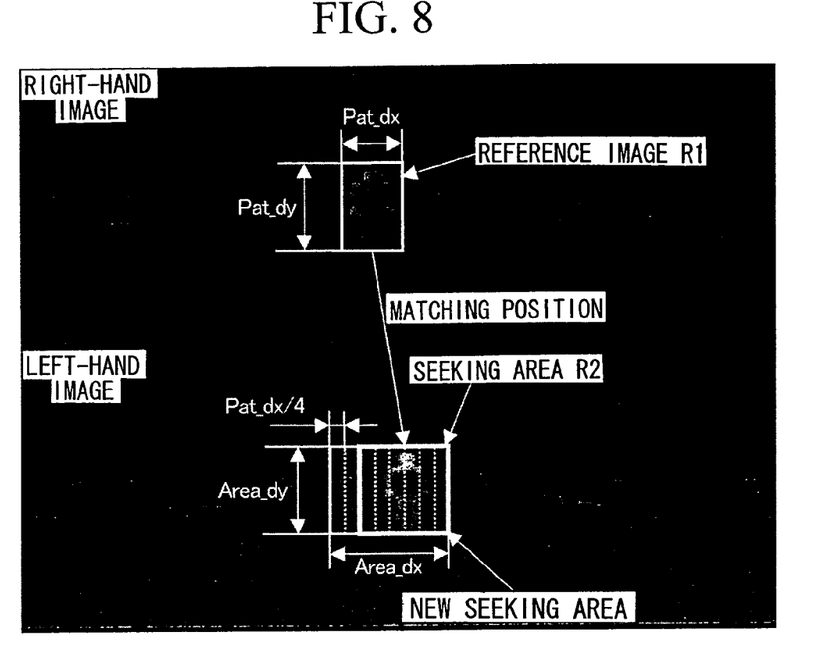
FIG. 8 is a diagram illustrating another step in the correlation calculation process, which is being applied to another new and smaller seeking area, in the image analysis device of the above embodiment.

FIGS. 6 to 8 are diagrams illustrating the correlation calculation process which is applied to the seeking areas. As shown in FIG. 6, first, the position of the reference image R1 is sequentially moved in the seeking area R2 in the left-hand image of the field stepwise at the increment of "Step" (Step=Pad_dx) while executing the correlation calculation process at each of the positions, and a new seeking area R2 is set, which consists of a correlation area corresponding to the position of the reference image R1 which gives the highest degree of correlation and horizontally arranged two areas each having a width of "Pad_dx" that sandwich the correlation area.

Next, as shown in FIG. 7, the position of the reference image R1 is sequentially moved in the new seeking area R2 in the left-hand image of the field stepwise at the increment of "Step" (Step=Pad_dx/2) while executing the correlation calculation process at each of the positions, and another new seeking area R2 is set, which consists of a correlation area corresponding to the position of the reference image R1 which gives the highest degree of correlation and horizontally arranged two areas each having a width of "Pad_dx/2" that sandwich the correlation area.

Similarly, as shown in FIG. 8, the position of the reference image R1 is sequentially moved in the new seeking area R2 in the left-hand image of the field stepwise at the increment of "Step" (Step=Pad_dx/4) while executing the correlation calculation process at each of the positions, and another new seeking area R2 is set, which consists of a correlation area corresponding to the position of the reference image R1 which gives the highest degree of correlation and horizontally arranged two areas each having a width of "Pad_dx/4" that sandwich the correlation area.

The above operations are repeated as long as the following inequity (6) is satisfied:

$$\text{Pat\_}dx/2^n \geq 1 (\text{pixel}) \tag{6}$$

The differential Min_cx, which is defined by the horizontal distance between the position of the reference image R1 in the left-hand image of the field at which the correlation error "Error" according to the SAD process is minimized and the position of the reference image R1 in the right-hand image of the field, is designated as the parallax Δd. Note that Pat_dx/$2^n$ is rounded so as to be an integer (the unit thereof is pixel).

In the above embodiment, it is assumed that the height of the seeking area is the same as that of the reference image R1 (i.e., Pat_dy=Area_dy); however, if the seeking area has a margin in also the vertical direction with respect to the reference image R1 (i.e., Pat_dy<Pat_Area), the increment at which the reference image R1 is moved in the vertical direction is set to one pixel.

In addition, in the above embodiment, the image processing unit 1 includes a distance calculation section. More specifically, steps S11 and S12 shown in FIG. 3, and steps S31 to S38 shown in FIG. 5 correspond to the distance calculation section.

According to the above description, in the present embodiment of the image analysis device, the number of sets of calculations (Calc_NN) required for finding the object parallax Δd is determined as follows:

$$\text{Calc\_NN} = (\text{Pat\_}dx \times \text{Pat\_}dy) \times (\text{Area\_}dx/\text{Pat\_}dx + 2 \times n + 1), \quad (7)$$

where "n" is the maximum integer that satisfies $\text{Pat\_}dx/2^n \geq 1$.

Using the equations (3) and (7), the number of sets of calculations in the present embodiment of the image analysis device and that in the conventional image analysis device are compared with each other below.

Assuming that Pat_dx=4, and Area_dx=32 as an example, Calc_NN/Calc_N=(32/4+2×2+1)/(32−4+1)=0.45, which means that the number of sets of calculations in the case of the present embodiment of the image analysis device is reduced to 45% of that in the case of the conventional image analysis device.

As another example, assuming that Pat_dx=4, and Area_dx=64, Calc_NN/Calc_N=(64/4+2×2+1)/(64−4+1)=0.34, which indicates that the number of sets of calculations is expected to be further reduced as the reference image R1 becomes larger, or as the seeking area R2 becomes larger.

Accordingly, even though the object in the image becomes larger as the distance to the object decreases when the parallax is calculated using the correlation calculation process, it is possible to determine the distance to the object without having an extreme increase in the number of sets of calculations.

Similarly, even though the seeking area is enlarged when the length of the baseline between cameras is increased, it is possible to determine the distance to the object without having an extreme increase in the number of sets of calculations.

In the above embodiment, it is assumed that the reference image R1 has been extracted; therefore, the process for determining the distance to the object explained above could be an effective means in the case as well in which an image representing shape of the object is used even if the image may not be taken by infrared cameras.

Figure 9:
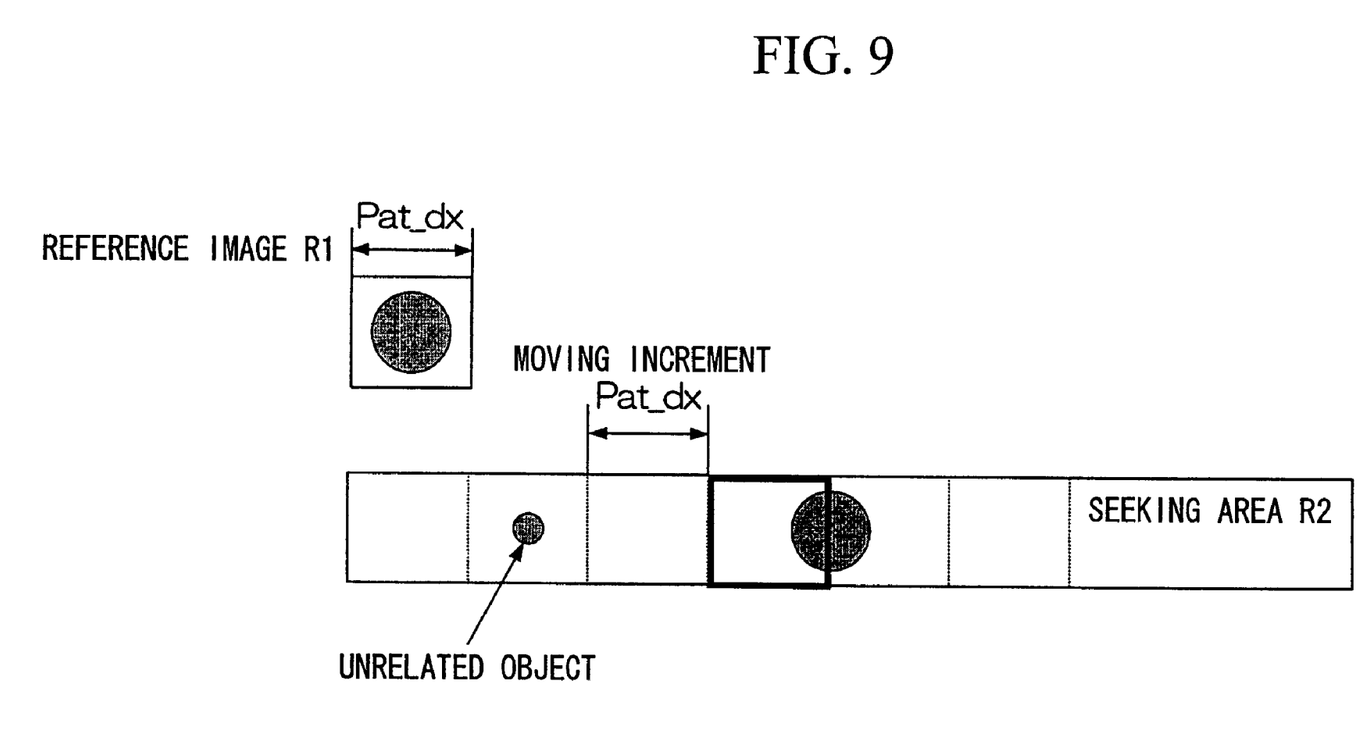
FIG. 9 is a diagram illustrating an advantageous effect in the case in which the width of a detecting image is set to the maximum moving increment in the image analysis device of the above embodiment.

In addition, in the operation according to the present embodiment of the image analysis device, because the maximum increment for seeking is set to the width of the reference pattern "Pat_dx" as shown in FIG. 9, the correlation calculation process can be executed with respect to at least a half of the reference image R1 in the seeking area; therefore, it is possible to reduce frequency of misperceptions in which a position, which gives the highest degree of correlation due to unrelated objects, is detected as the position of an object.

Advantageous Effects Obtainable by the Invention

As explained above, according to the image analysis device of the present invention, when the distance calculation section applies the correlation calculation process to the seeking area set in the image of the field taken by the second camera using the first image of the object, it is possible to extract a new seeking area, which has a high degree of correlation with the first image of the object, and in which the second image of the object is likely to exist, through an accurate and small quantity of calculation by executing the correlation calculation process so as to roughly seek in the seeking area while moving the first image of the object stepwise at the moving increment which is determined based on the object frame that is set to the first image of the object.

Accordingly, when the distance to an object is calculated using a parallax between images of the object taken by stereo cameras, even if the length of the baseline between the cameras is increased in order to increase accuracy in calculating the distance to the object, it is possible to determine the distance to the object in a short period and using a simple computer without having an extreme increase in the amount of calculation even though the seeking area is enlarged due to the lengthened baseline between the cameras.

According to another image analysis device of the present invention, because the moving increment, at which the first image of the object is moved stepwise in the seeking area, is set to be equal to the width of the object frame that is set to the first image of the object, the correlation calculation process will not be duplicated when the first image of the object is moved in the seeking area, and thus the correlation calculation process can be effectively executed over the entire seeking area. In addition, because the object that is taken as the first image of the object is detected just once in the seeking area, the object can be easily differentiated from other things.

Accordingly, the correlation calculation process can be executed with respect to at least a half of the reference image in the seeking area; therefore, it is possible to reduce frequency of misperceptions in which a position which gives the highest degree of correlation due to unrelated objects is detected as the position of the object.

According to another image analysis device of the present invention, precise seeking can be executed in the seeking area while moving the first image of the object at the smaller moving increment as the seeking area is made smaller and areas having a high degree of correlation are narrowed, and thus an accurate correlation calculation process can be effectively executed with minimum quantity of calculation.

Accordingly, in particular, even in the case in which the width of an object is great, it is possible to accurately calculate the distance to the object in a short period by roughly seeking first, and then by gradually increasing preciseness of seeking as the size of the seeking area decreases.

Although there have been described what are the present embodiments of the invention, it will be understood by persons skilled in the art that variations and modifications may be made thereto without departing from the spirit or essence of the invention. The scope of the invention is indicated by the appended claims.

What is claimed is:

1. An image analysis device comprising:
first and second cameras which together constitute a set of stereo cameras; and
a distance calculation section which is adapted to calculate distance to an object in such a manner that a first image of the object is extracted from an image of a field taken by the first camera while a second image of the object corresponding to the first image of the object is extracted from a seeking area being set, in another image of the field taken by the second camera, depending on the extracted first image using a correlation calculation process, and then a parallax between the first and second images is calculated, wherein
the distance calculation section is further adapted to set a moving increment based on the width of an object frame that is determined depending on the first image of the object, and to execute the correlation calculation process while moving the first image of the object stepwise at the moving increment in the seeking area so as to extract a new seeking area which consists of a correlation area that exhibits a high degree of correlation with the first image of the object and two areas that sandwich the correlation area.

2. An image analysis device according to claim 1, wherein the moving increment is set to be equal to the width of the object frame.

3. An image analysis device comprising:
first and second cameras which together constitute a set of stereo cameras; and
a distance calculation section which is adapted to calculate distance to an object in such a manner that a first image of the object is extracted from an image of a field taken by the first camera while a second image of the object corresponding to the first image of the object is extracted from a seeking area being set, in another image of the field taken by the second camera, depending on the extracted first image using a correlation calculation process, and then a parallax between the first and second images is calculated, wherein
the distance calculation section is further adapted to set a moving increment based on the width of an object frame that is determined depending on the first image of the object, and to execute the correlation calculation process while moving the first image of the object stepwise at the moving increment in the seeking area so as to extract a new seeking area which consists of a correlation area that exhibits a high degree of correlation with the first image of the object and two areas that sandwich the correlation area,
wherein the moving increment is set to be equal to the width of the object frame, and
wherein the distance calculation section is further adapted to reset the moving increment to a smaller moving increment based on the width of the object frame every time a new seeking area is extracted, and to execute the correlation calculation process in the new seeking area while moving the first image of the object stepwise at the smaller moving increment.

4. An image analysis device comprising:
first and second cameras which together constitute a set of stereo cameras; and
a distance calculation section which is adapted to calculate distance to an object in such a manner that
a first image of the object is extracted from a first field image of a field taken by the first camera
while a second image of the object corresponding to the first image of the object is extracted from a seeking area that is set, in a second field image of the field taken by the second camera, depending on the extracted first image using a correlation calculation process, and
then a parallax between the first and second images is calculated, wherein the distance calculation section is further adapted to
set a moving increment based on a width of an object frame that defines a periphery of the first image of the object, and
execute the correlation calculation process while moving the first image of the object within the seeking area stepwise a distance equal to the moving increment so as to extract a new seeking area which consists of an area that is the sum of
a correlation area that exhibits a high degree of correlation with the first image of the object, and
two areas that sandwich the correlation area.

5. The image analysis device of claim 4 wherein the moving increment is set to be equal to the width of the object frame.

6. The image analysis device of claim 4 wherein the moving increment is set to be equal to a fraction of the width of the object frame.

7. The image analysis device of claim 4 wherein the extraction of the second image of the object is achieved iteratively, the iteration step identified by the value n, where n is initially set to be zero, and
the moving increment is set according to the following equation:

moving increment=(width of the object frame)/$2^n$.

8. A method of analyzing an image using an image processing device, the image processing device comprising:
first and second cameras which together constitute a set of stereo cameras; and
a distance calculation section,
wherein the distance calculation section is adapted to calculate distance to an object using the following method steps:
extracting a first object image of the object from a first field image of a field taken by the first camera, the first image comprising an object frame, the object frame comprising a frame width substantially corresponding to the width of the first object image,
setting an initial step width, the initial step width based on the frame width,
setting a seeking area in a second field image of the field taken by the second camera,
setting a search area within the seeking area, the search area comprising an area substantially corresponding to the area of the object frame, the search area set within the seeking area such that a left edge of the search area overlies a left edge of the seeking area, and executing a correlation calculation process within the search area,
moving the search area within the seeking area to the left within the seeking area a distance corresponding to the initial step width and executing a correlation calculation process within the search area,
repeating the step of moving the search area and executing a correlation calculation process across a width of the seeking area,
identifying the position of the search area having the highest degree of correlation with the first object image of the object,
extracting a second object image of the object, corresponding to the first object image of the object, from the seeking area,
calculating a parallax between the first and second object images.

9. The method of analyzing an image using an image processing device of claim 8, wherein the distance calculation section comprises the following additional method steps inserted following the step of identifying the position of the search area having the highest degree of correlation:
extracting a new seeking area in the second field image which consists of an area that is the sum of
the search area identified as having the highest degree of correlation with the first object image of the object, and
two areas that sandwich the correlation area, setting a new step width, the new step width comprising a fraction of the initial step width, setting a new search area within the new seeking area, the new search area comprising an area corresponding to a fraction of the area of the object frame, the new search area set within the new seeking area such that a left edge of the new search area overlies a left edge of the new seeking area, and executing a correlation calculation process within the new search area, moving the new search area within the new seeking area to the left within the new seeking area a distance corresponding to the new step width and executing a correlation calculation process within the new search area, repeating the step of moving the new search area and executing a correlation calculation process until a right edge of the new search area lies outside the new seeking area, identifying the position of the new search area having the highest degree of correlation with the first object image of the object.

* * * * *

UNITED STATES PATENT AND TRADEMARK OFFICE
CERTIFICATE OF CORRECTION

PATENT NO. : 7,221,777 B2 Page 1 of 1
APPLICATION NO. : 10/607647
DATED : May 22, 2007
INVENTOR(S) : Nagaoka et al.

It is certified that error appears in the above-identified patent and that said Letters Patent is hereby corrected as shown below:

On The Title Page:

Item 75 under Inventors: for the third inventor, please change "Takayui Tsuji" to -- Takayuki Tsuji --.

Signed and Sealed this

Eighteenth Day of September, 2007

JON W. DUDAS
*Director of the United States Patent and Trademark Office*